(12) United States Patent
Tanaka et al.

(10) Patent No.: US 6,397,067 B1
(45) Date of Patent: May 28, 2002

(54) ROADSIDE TRANSMITTER

(75) Inventors: Keiji Tanaka; Takashi Maehata, both of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/763,887

(22) PCT Filed: Jun. 22, 2000

(86) PCT No.: PCT/JP00/04122
§ 371 (c)(1),
(2), (4) Date: Apr. 23, 2001

(87) PCT Pub. No.: WO01/05065
PCT Pub. Date: Jan. 18, 2001

(30) Foreign Application Priority Data

Jul. 7, 1999 (JP) ............................................. 11-193485

(51) Int. Cl.$^7$ ................................................ H04M 1/38
(52) U.S. Cl. .......................... 455/446; 455/561; 455/71; 455/63
(58) Field of Search ................................. 455/561, 562, 455/446, 71, 63; 342/175, 357, 358

(56) References Cited

U.S. PATENT DOCUMENTS

| | | | | |
|---|---|---|---|---|
| 5,249,303 A | * | 9/1993 | Goeken ...................... 455/33.4 |
| 5,703,595 A | * | 12/1997 | Tayloe et al. ................ 342/175 |
| 5,794,119 A | * | 8/1998 | Evans et al. .................. 455/6.2 |
| 6,011,515 A | * | 1/2000 | Radcliffe et al. ............ 342/453 |
| 6,091,355 A | * | 7/2000 | Cadotte, Jr. et al. ........ 342/104 |
| 6,199,011 B1 | * | 3/2001 | Matsuda ..................... 701/208 |

FOREIGN PATENT DOCUMENTS

| | | |
|---|---|---|
| JP | 57-181242 | 11/1982 |
| JP | 3-190331 | 8/1991 |
| JP | 8-241495 | 9/1996 |
| JP | 10-107721 | 4/1998 |

* cited by examiner

*Primary Examiner*—Daniel Hunter
*Assistant Examiner*—Lana Le
(74) *Attorney, Agent, or Firm*—McDermott, Will & Emery (57) ABSTRACT

In a communication system between a road and a vehicle, communicating between a plurality of road communication stations arranged in a cell and a vehicle-mounted mobile station within the cell, a vehicle-mounted transmitting equipment, in which communication is not interrupted even when a received frequency varies due to the Doppler effect and which performs stable communication, is realized. A transmitting antenna 36a having a directivity in the running direction of the vehicle and a transmitting antenna 36b having a directivity opposite to the running direction of the vehicle are arranged. An offset for increasing a frequency is provided for a radio wave emitted from the antenna 36a while an offset for lowering a frequency is provided for a radio wave emitted from the antenna 36b. The variation in the received frequency depending on the Doppler shift is reduced for the vehicle-mounted receiving device to facilitate automatic frequency control (AFC), thereby reducing degradation in the quality of data after demodulation.

5 Claims, 9 Drawing Sheets

ROADSIDE TRANSMITTER

TECHNICAL FIELD

The present invention relates to a road transmission equipment used in a communication system between a road and a vehicle, allowing mobile communication between a road and a mobile station by locating a plurality of road antennas along the road to form a cell on the road.

BACKGROUND ART

There is an increasing demand for communications between road controllers and vehicles. On a superhighway, in particular, to enable a vehicle to operate on the road without any burden on the driver and any accident both for the controller and the driver, frequent interchange of information is necessary between the road and the vehicle. One type of such a developed system is a self-operating system that allows a vehicle to run with close communication between the road and the vehicle, which are equipped with various sensors and a camera (see, for example, Japanese Unexamined Patent Publication No. 241495 of 1996).

For the construction of a driving support system (hereinafter, referred to as "communication system between a road and a vehicle") which makes use of the communication with the vehicle for future extension into a self-operating system, it is necessary to provide a communication area (cell) on the road.

To provide such a cell, we may consider laying a leakage coaxial cable along the road. However, the drawback of this method is that large-scale construction is needed for laying such a cable. In addition, since it is required to locate the leakage coaxial cable at a relatively low position on the ground, the distance for which a radio wave propagates in a direction across a traffic lane is disadvantageously short.

On the other hand, if the communication is performed with a plurality of road antennas being arranged on the road at predetermined intervals, a single road antenna can cover a relatively large cell. In this case, each of the road antennas is connected to a central base station of the road controller via an optical fiber and the like.

In the case where the road antennas are provided, when a large-size vehicle comes proximate to a small-size vehicle, it obstructs the view of the driver of the small-size vehicle, preventing him from seeing the road antenna from inside the small-size vehicle. In particular, it is likely that a microwave or a millimeter wave of a high frequency having a small angle of diffraction is blocked. Accordingly, the communication between the vehicle and the road is interrupted, thereby preventing continued communications.

Therefore, in order to enable continuous communications between the road and the vehicle, multi-station communication has been proposed According to this multi-station communication, a plurality of road antennas having an inherent directivity are provided along the road, and radio waves of the same frequency and the same content are emitted from the respective road antennas toward the same cell.

A multi-station communication system is advantageous because such a system has a plurality of propagation paths for radio waves to be emitted and therefore the radio wave avoids being blocked so as to continuously perform smooth communication between a mobile station and a road communication station even when a vehicle runs proximate to a large-size vehicle such as a truck.

In the multi-station communication system, however, the Doppler effect occurs when a vehicle moves. The antennas receiving radio waves from the front and behind receive radio waves of respectively different frequencies based on Doppler shift.

FIG. 9(a) shows an arrangement of conventional road antennas a, b, and c in a multi-station communication system and a vehicle running under these antennas. A receiving antenna 61 and a receiving device 4 are mounted on the vehicle.

FIG. 9(b) is a graph showing the transitions of deviations of the frequencies received by the receiving antenna 61. The transition of a deviation of the frequency received by the receiving antenna 61 from the road antenna a is indicated by a line a; the transition of a deviation of the frequency received by the receiving antenna 61 from the road antenna b is indicated by a line b, and the transition of a deviation of the frequency received by the receiving antenna 61 from the road antenna c is indicated by a line c.

An exemplar value of the deviation of the frequency received from the road antenna a will be given. Doppler shift $\Delta f$ is expressed by: $\Delta f = f0 \, v/c$ (c is a velocity of light), where a transmitted frequency of the road antenna is f0, and v is a velocity of a vehicle. When the vehicle runs on the road, the Doppler shift $\Delta f$ is given by:

$$\Delta f = f0(v/c) L (L^2 + H^2)^{-\frac{1}{2}}$$

where the height of the road antenna from the ground is H, and a distance between the vehicle and the road antenna is L. Assuming f0=5.8 GHz, v=100 km/h, and H=10 (m), the Doppler shift $\Delta f$ is expressed by:

$$\Delta f = 537 \cdot L (L^2 + H^2)^{-\frac{1}{2}} (\text{Hz})$$

When the distance between the road antennas is set to 50 (m), the value of L ranges from 0 (m) to 50 (m). Accordingly, the Doppler shift $\Delta f$ ranges from 0 to 527 (Hz). At the middle point between the antennas, i.e. L=25 (m), the Doppler shift $\Delta f$ is 499 (Hz).

With the arrangement of the road antennas as shown in FIG. 9(a), there occurs skipping of received frequencies as shown in FIG. 9(b) each time a vehicle passes near the middle point between the antennas. This skipping is caused because the automatic frequency control (AFC) of the receiving device 4 is drawn toward the frequency having greater receiving power. This skipping makes it difficult to follow the frequency control in a receiving section, resulting in the interruption of communication during the occurrence of skipping.

Accordingly, it is desired to reduce the Doppler effect on the side of the road-transmitting device in the communication system between a road and a vehicle performing communication between a plurality of road communication stations arranged in a cell and a vehicle-mounted mobile station within the cell.

DISCLOSURE OF THE INVENTION (1) A road transmission equipment as set forth in claim 1 with the view of achieving the abovementioned object, comprises:
   a first transmitting antenna having a directivity in a running direction of a vehicle,
   a second transmitting antenna having a directivity in a direction opposite to the running direction of the vehicle, a first transmitting section and a second transmitting section respectively connected to the first transmitting antenna and the second transmitting antenna to output signals of the same frequency, and a frequency correction section, wherein;
the frequency correction section performs correction so as to provide the first transmitting section with a positive frequency offset for increasing a frequency of a signal supplied to the first transmitting antenna, and so as to provide the second transmitting section with a negative frequency offset for lowering a frequency of a signal supplied to the second transmitting antenna.

In the present invention, an offset for increasing the frequency is provided for an radio wave directed in the running direction of the vehicle while an offset for lowering the frequency is provided for an radio wave directed in the opposite direction to the running direction of the vehicle, for transmission of these radio waves.

Therefore, the variation in the received frequency based on the Doppler shift is reduced for the vehicle-mounted receiving device to lessen the requirements for frequency control of automatic frequency control (AFC). Thus, the degradation of the quality of data after demodulation is reduced.

(2) It is preferred that the amounts of the positive frequency offset and the negative frequency offset provided by the frequency correction section are equal to each other (claim 2).

The reason being that since the running speed of the vehicle is normally almost consistent within the cell, the amount of Doppler shift of the radio wave directed in the running direction of the vehicle, to which the vehicle-mounted receiving device is subjected, is also considered to be the same as that of the radio wave directed in the opposite direction to the running direction, to which the vehicle-mounted receiving device is subjected.

(3) The road transmission equipment according to the present invention may further comprise a speed detection means for detecting the speed of the vehicle running in the cell, wherein
the frequency correction section may set the amount of the frequency offset based on the detected speed of the vehicle (claim 3).

Since the amount of Doppler shift of the vehicle-mounted receiving device can be obtained if the running speed of the vehicle can be detected, the amount of a frequency offset can be set based on the amount of the Doppler shift. Accordingly, in the case where the speed of the vehicle changes with time, accurate frequency correction can be performed in real time.

When a plurality of vehicles are present in the cell and the speed of each vehicle can be detected, the amount of frequency offset is set based on the average value of the speeds of a plurality of vehicles.

(4) The amount of the frequency offset provided by the frequency correction section may be set to a fixed value on the assumption that the vehicle is subjected to constant Doppler shift (claim 4).

Normally, it is considered that the running speed of a vehicle is almost always consistent within the same cell on the same road and does not greatly change with time (although the running speed changes considerably in the case of traffic restriction or traffic congestion, the frequency and the duration of traffic restriction or traffic congestion cannot be predicted).

Therefore, even with the fixed amount of frequency offset, the object of the present invention of reducing the variation in the received frequency based on the Doppler shift can be achieved.

Moreover, since the speed detection means is no longer needed, the configuration of the road transmission equipment is advantageously simplified.

(5) The first transmitting section and the second transmitting section may transmit an orthogonal frequency division multiplex (OFDM) modulated radio wave (claim 5).

Figure 9:
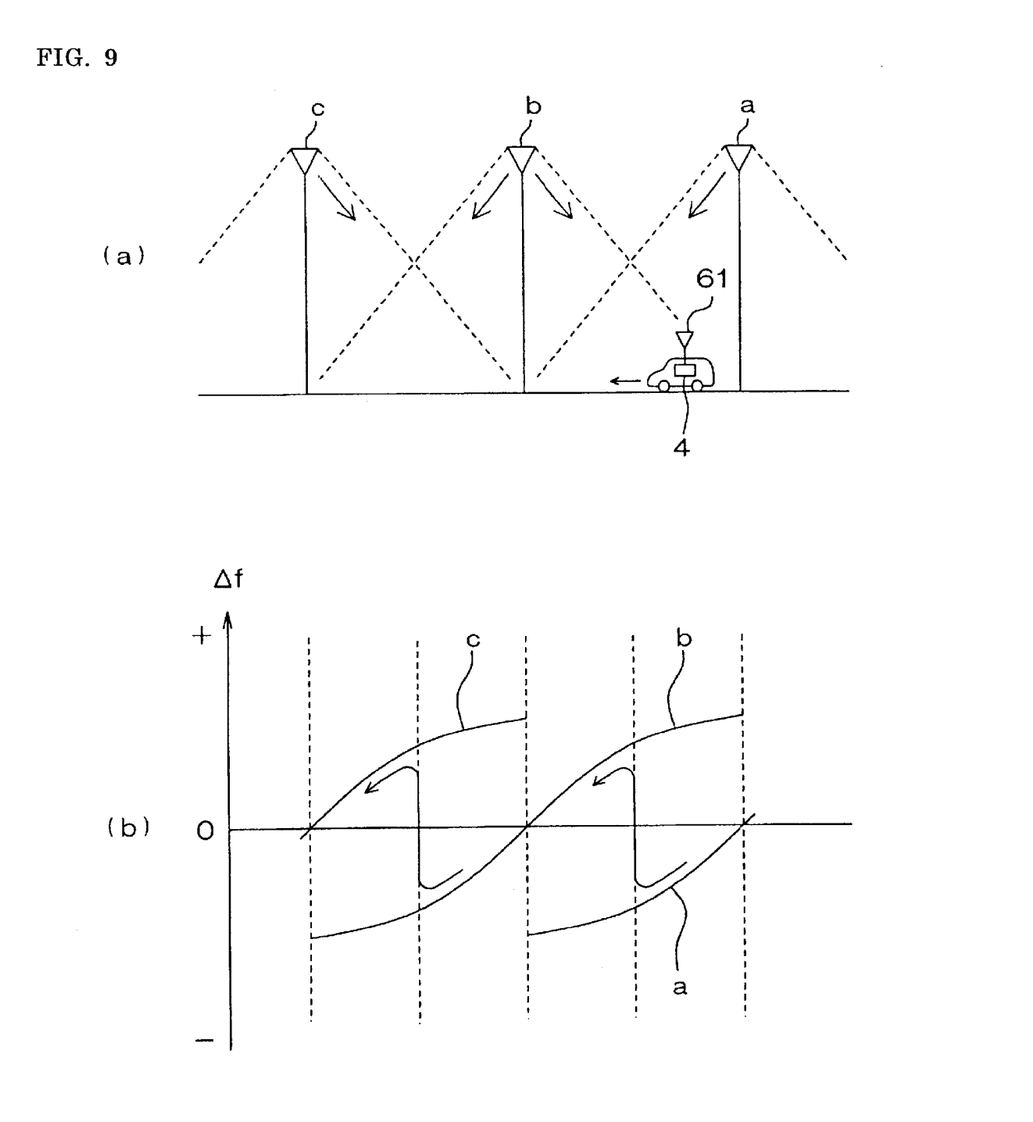
FIG. 9(a) is a layout drawing showing the arrangement of three road antennas a, b, and c of a conventional multi-station communication system and a vehicle running thereunder.
FIG. 9(b) is a graph showing the transition of a deviation of a received frequency.

In a case where an OFDM modulation method is used for dividing transmitted information into subcarriers and transmitting the obtained subcarriers, the sensitivity of a bit error rate with respect to a frequency disarrangement is high because a distance between the frequencies of adjacent subcarriers is small. Accordingly, in a conventional communication system between a road and a vehicle as illustrated in FIG. 9, a Doppler frequency change increases, thereby degrading the transmission characteristics.

Since the correction for providing a frequency with an offset is performed so as to reduce a Doppler frequency change in the present invention, the present invention is extremely effective for a communication system between a road and a vehicle using an OFDM modulation method.

BEST MODE FOR CARRYING OUT THE INVENTION

Embodiment 1

Hereinafter, a preferred embodiment of the present invention will be described in detail with reference to the attached drawings.

Figure 1:
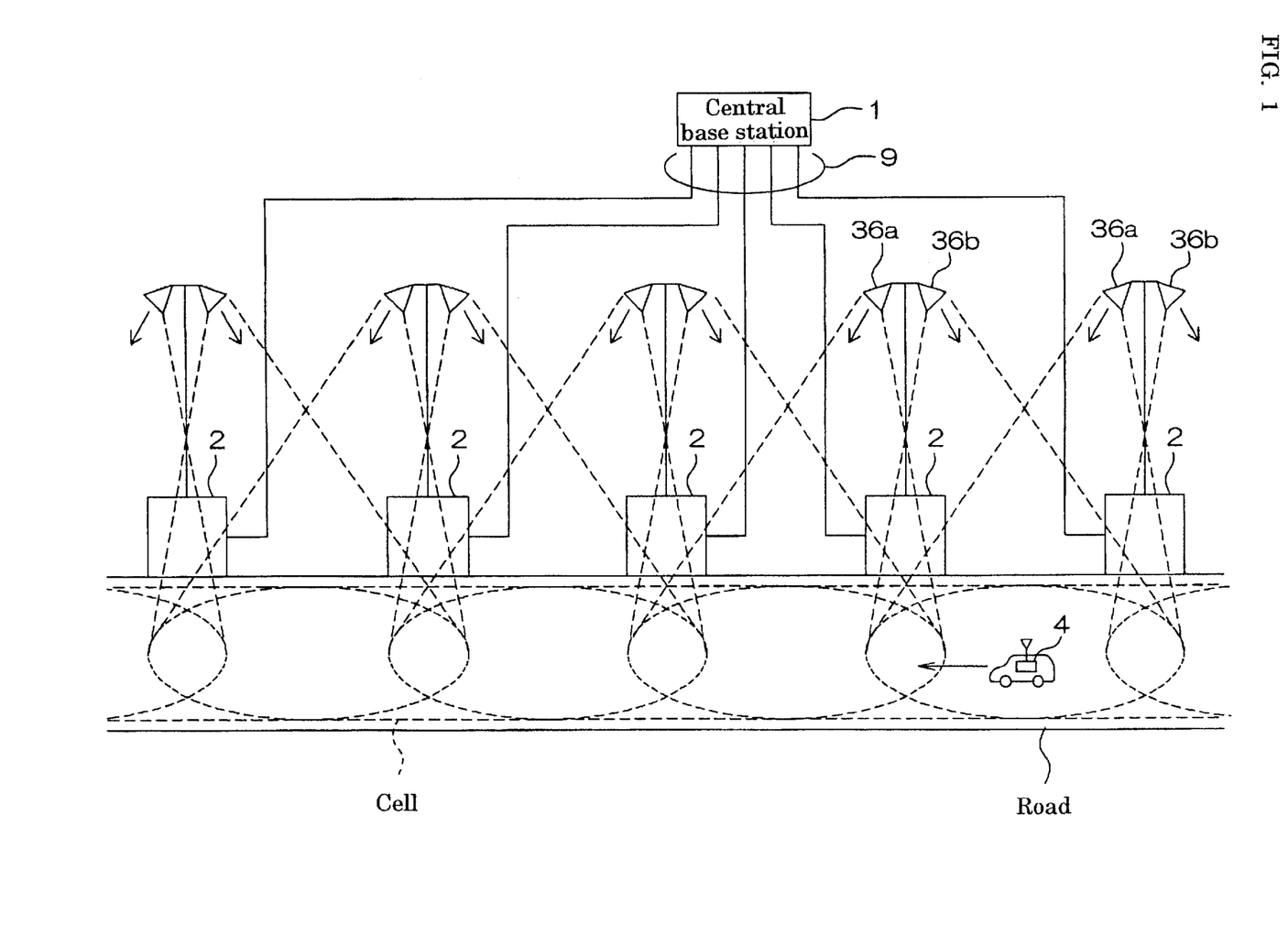
FIG. 1 is a conceptual view showing the configuration of a communication system between a road and a vehicle.

FIG. 1 is a conceptual view showing the configuration of a communication system between a road and a vehicle. This communication system between a road and a vehicle transmits and receives road transportation information between a road communication station and a mobile station mounted on a vehicle.

A cell is formed along the road. In the cell or in the vicinity thereof, a plurality of transmitting and receiving stations 2 are arranged at intervals. Each of the transmitting and receiving stations 2 has an antenna 36a having a forward directivity and an antenna 36b having a rearward directivity along a running direction of the vehicle.

A radio wave having a frequency offset toward the positive side is emitted into the cell from the antennas 36a having a forward directivity, while a radio wave having a frequency offset toward the negative side is emitted into the cell from the antennas 36b having a rearward directivity.

The radio waves emitted from the antennas have the same frequency with exclusion of the offsets.

The transmitting and receiving station 2 acquires transmitted data via a wire transmission line 9 such as an optical fiber or a coaxial cable (although a wireless transmission line may be used instead of the wire transmission line, it is assumed hereinafter to use the "wire transmission line 9") from a central base station 1. The transmitted data is then subjected to OFDM modulation using a plurality of carrier waves (subcarriers) orthogonally crossing each other, and is transmitted as a wireless radio wave into the cell. The transmitting and receiving station 2 receives the OFDM modulated wireless radio wave from the vehicle-mounted mobile station 4 in the cell, and then perform OFDM demodulation on this wireless radio wave so as to transmit the received data via the wire transmission line 9 from the central base station 1.

The combination of the function of the transmitting and receiving station 2 and the function of the central base station 1 will be referred to as the "road communication station".

The reason for use of the OFDM modulation method is as follows.

In the case of multi-station communication, since a plurality of radio waves are emitted with similar transmission power into the same cell, phasing is caused by multipath. As a result, intercarrier interference or intersymbol interference frequently occurs. Consequently, it is essential to remove the effects of such interference in the system construction.

Generally, a mobile object communication system using a single carrier is likely to be subjected to the effect of intersymbol interference by the multipath delayed wave.

Accordingly, it is proposed to use the OFDM modulation method that is capable of transmitting a plurality of subcarriers obtained by dividing a carrier. The OFDM modulation method is advantageous in that the effects of a delayed wave can be eliminated by setting a guard time.

Figure 2:
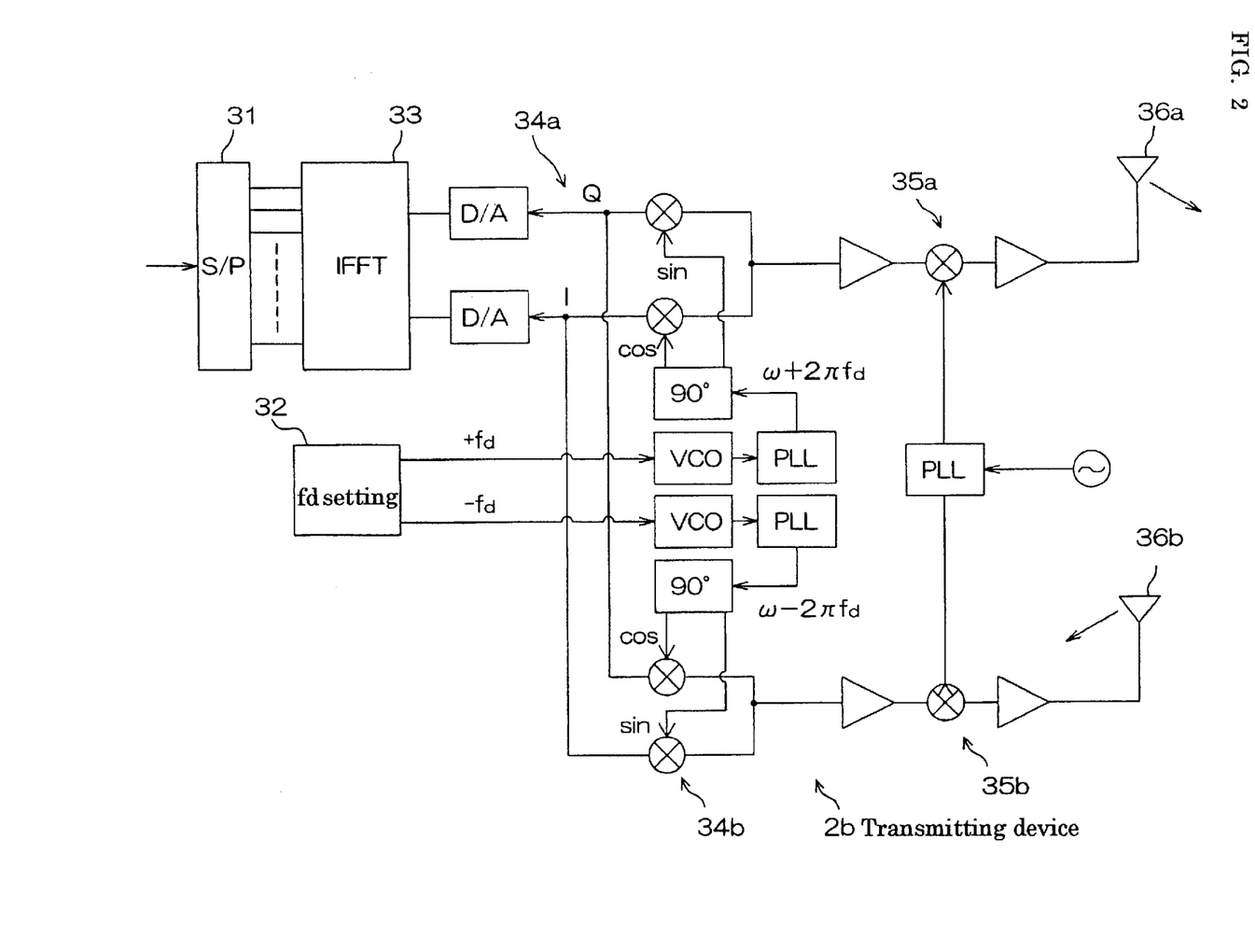
FIG. 2 is a block diagram showing the internal configuration of a transmitting device 2b of a transmitting and receiving station 2.

FIG. 2 is a block diagram showing the internal configuration of a transmitting device 2b of the transmitting and receiving station 2.

The transmitting device 2b comprises a serial/parallel (S/P) converting circuit 31, an fd setting circuit 32, an inverse Fourier transform circuit 33, QPSK modulation circuits 34a and 34b, up-converters 35a and 35b and the like.

The inverse Fourier transform circuit 33 realizes various functions as follows. The inverse Fourier transform circuit 33 performs inverse Fourier transform on the transmitted data supplied in parallel from the S/P converting circuit 31, converts the inverse Fourier transformed data to return it to serial, and time-compresses a serial symbol string so as to move a posterior symbol to the beginning of the string, thereby setting a guard time.

Figure 3:
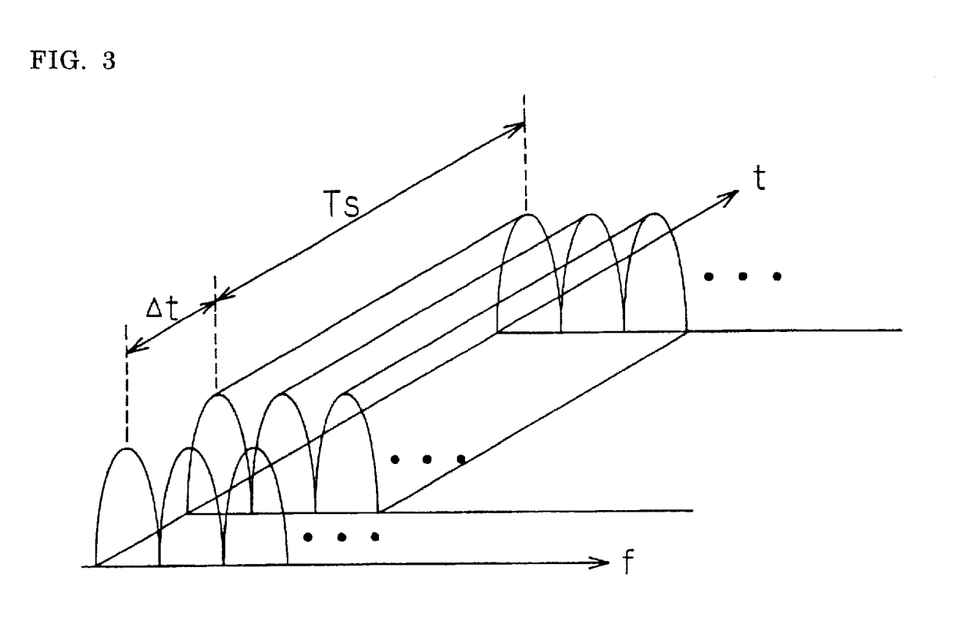
FIG. 3 is a graph illustrating symbol transmission by OFDM on a frequency axis f and a time axis t.

FIG. 3 is a graph showing the symbol transmission by OFDM on a frequency axis f and a time axis t. An effective symbol length is represented by TS, and a guard time is given by Δt. A time compression ratio is represented by (TS+Δt)/TS. In the case of QPSK, TS is expressed by:

$$TS = 2 \ n/m(\mu sec)$$

where the number of subcarriers is n, and the transmission rate is m (Mbps).

It is required to set the guard time Δt of the OFDM modulation to be longer than the time delayed by the multipath. In this way, the transmitting and receiving station 2 and the vehicle-mounted mobile station 4 can avoid intersymbol interference so as to accurately restore the received signal without being adversely affected by the propagation delay due to the presence of a plurality of propagation paths for the radio wave (multipath).

With reference to FIG. 2, the QPSK modulation circuits 34a and 34b perform QPSK transform by D/A converting a signal corresponding to the phase 0° and a signal corresponding to the phase 180°, and a signal corresponding to the phase 90° and a signal corresponding to the phase 270° which are output from the inverse Fourier transform circuit 33, subjecting these signals respectively to a sin wave and a cos wave, and adding them.

Needless to say, although QPSK modulation is performed in this embodiment, other modulation methods, for example, QAM, BPSK, 8PSK and the like may be used. In the following description, however, it is assumed that QPSK modulation is performed unless specifically noted.

The up-converters 35a and 35b are circuits for frequency conversion into a wireless frequency. The output signals from the up-converters 35a and 35b pass through a circulator and a coaxial cable to be emitted from road antennas 36a and 36b as radio waves.

Herein, a method for providing a frequency with an offset in the QPSK modulation circuit 34 will be described.

The $f_d$ setting circuit 32 is a circuit for setting an offset frequency $f_d$. For this setting of the offset frequency, there are methods of: (1) detecting running speed of a vehicle moving on the road in real time, thereby setting the offset frequency; and (2) previously giving the offset frequency as a constant.

For detecting the running speed of a vehicle according to the method (1), for example, there are (1-1) a method for obtaining average running speed of the vehicles based on the speed information transmitted from each vehicle within the cell; (1-2) a method for obtaining average running speed by detecting the speed of each vehicle with an ultrasonic speed sensor or a television camera being arranged on the road; and (1-3) a method for obtaining the average running speed of the vehicles by detecting the speed of each vehicle based on Doppler shift Δf detected on automatic frequency control (AFC) in the receiving device 2a.

In the method (2) of previously giving an offset frequency as a constant, it is assumed that the vehicle always runs at the speed which has been previously obtained in a statistical or experimental fashion within the cell. On the road where traffic is constant, the configuration can be simplified with the running speed of a vehicle being fixed as a constant rather than with the running speed detected in real time because it is not necessary to provide a running speed detection means.

The amount of the offset frequency fd is set to be a half of the maximum Doppler shift Fd (fd=Fd/2) which a vehicle experiences in a case where the vehicle runs at said speed.

A signal corresponding to the thus set offset frequency+fd is supplied to a voltage control oscillation (VCO) circuit. Then, a signal having an angular frequency of ω+2πfd is generated by a PLL oscillator. After being provided with a phase difference of 90° by a phase-shift circuit, the signal having an angular frequency of ω+2πfd is supplied to the QPSK modulation circuit 34a.

On the other hand, a signal corresponding to the offset frequency−fd is supplied to a VCO circuit. Then, a signal having an angular frequency of ω−2πfd is generated by the PLL oscillator. After being provided with a phase difference of 90° by the phase-shift circuit, the signal having an angular frequency of ω−2πfd is supplied to the QPSK modulation circuit 34b.

As a result, a frequency signal having an offset of +fd is obtained from the QPSK modulation circuit 34a while a frequency signal having an offset of −fd is obtained from the QPSK modulation circuit 34b.

Figure 4:
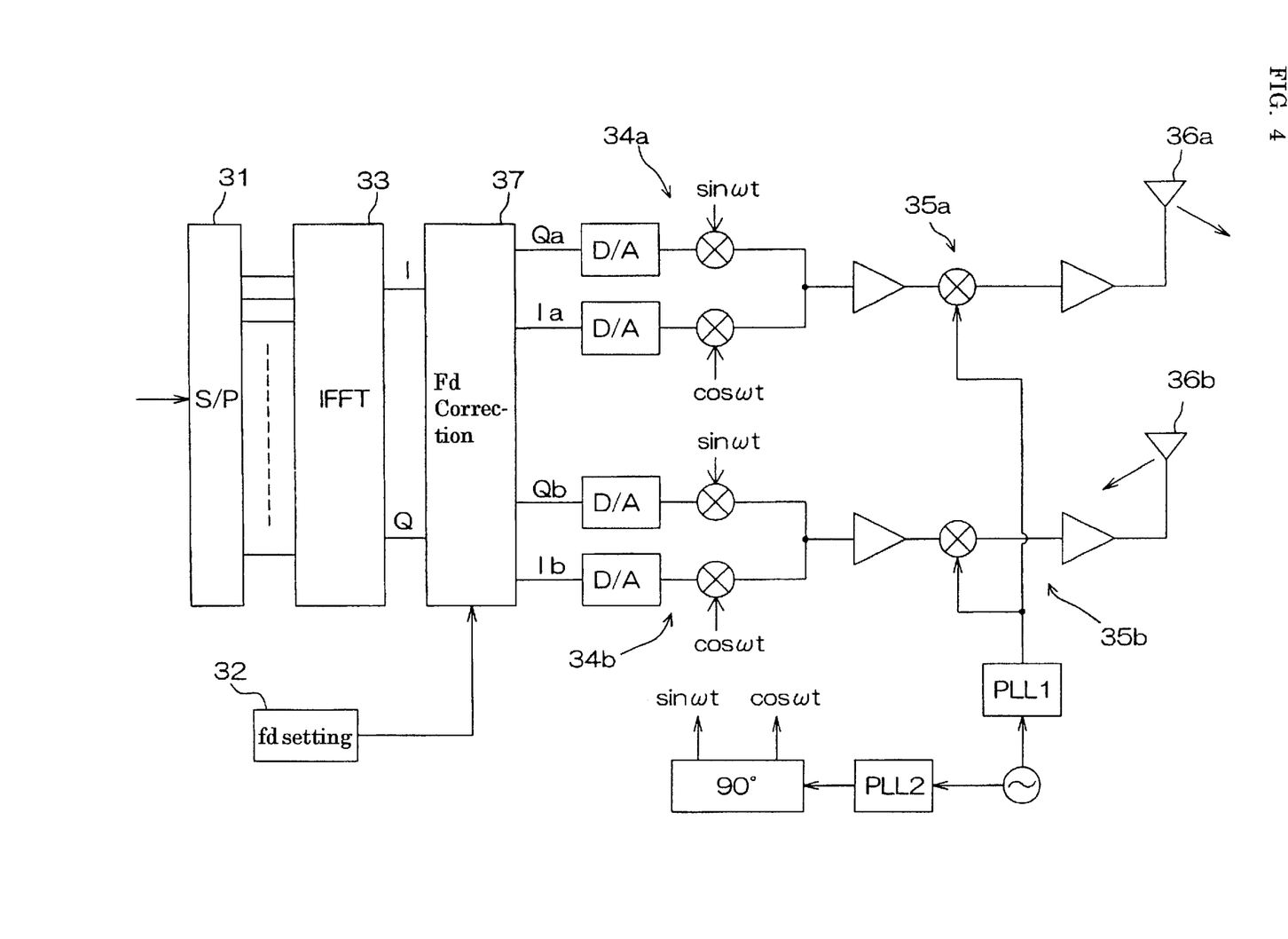
FIG. 4 is a block diagram showing an exemplary modification of the internal configuration of the transmitting device 2b shown in FIG. 2.

FIG. 4 is a block diagram showing an exemplary modification of the internal configuration of the transmitting device 2b shown in FIG. 2.

In comparison, the circuit configuration shown in FIG. 4 differs from that shown in FIG. 2 in that a signal I having an in-phase component and a signal Q having an orthogonal component to be input into the QPSK modulation circuit 34 are subjected to frequency correction so as to be provided with offsets while signals having angular frequencies of ω±2πf$_d$ are supplied to a local oscillation circuit of the QPSK modulation circuit 34 so as to be provided with offsets in the circuit configuration of FIG. 2.

A circuit for correcting the offset frequency is an f$_d$ correction circuit 37.

Figure 5:
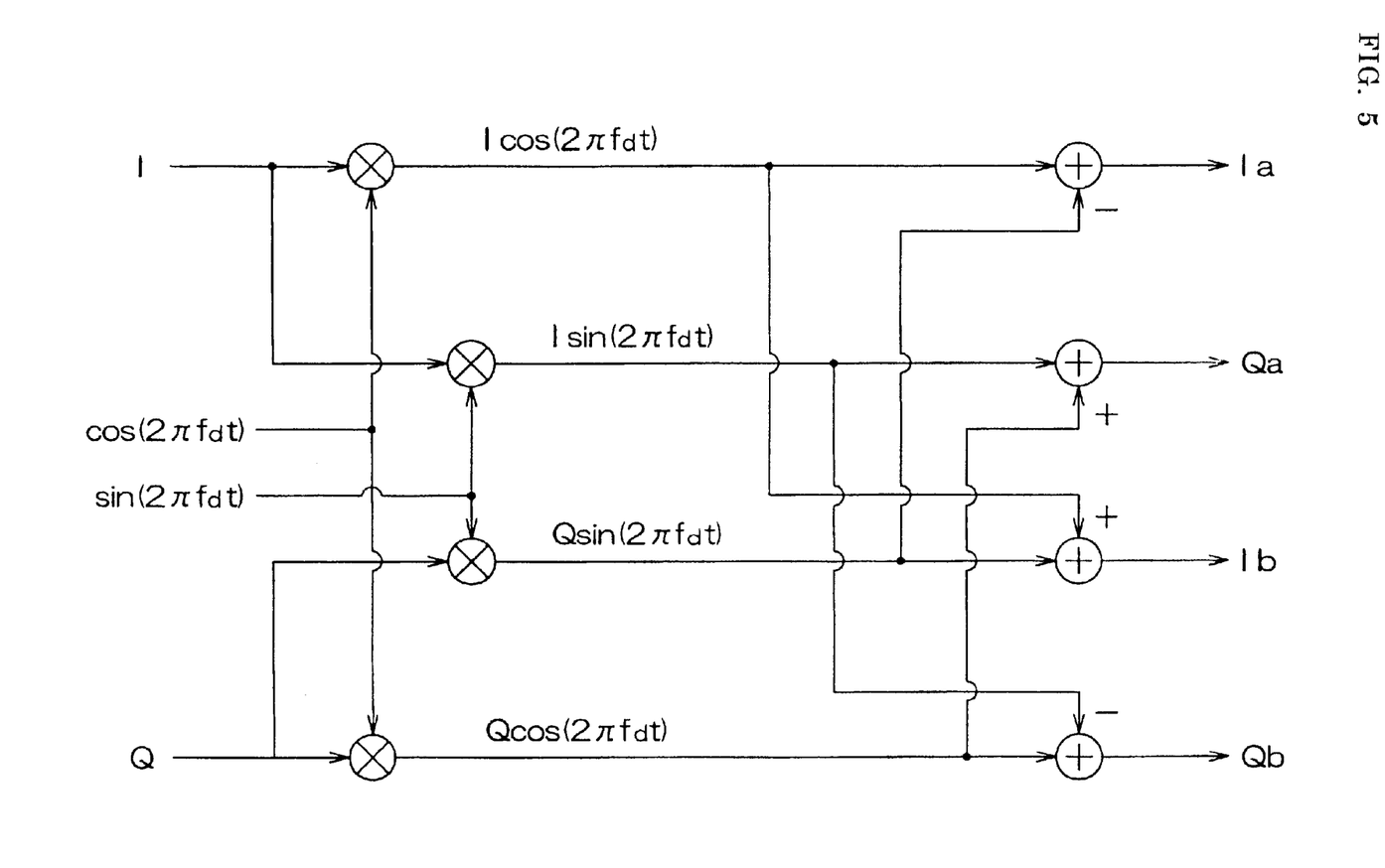
FIG. 5 is a circuit diagram showing an $f_d$ correction circuit 37 of the transmitting device 2b shown in FIG. 4.

FIG. 5 is a circuit diagram showing the internal configuration of the fd correction circuit 37. The fd correction circuit 37 produces signals of cos(2πfdt) and sin(2πfdt) based on the information of the offset frequency fd obtained from the fd setting circuit 32. Then, the signal I having an in-phase component and the signal Q having an orthogonal component output from the inverse Fourier transform circuit 33 are respectively multiplied by cos(2πfdt) and sin(2πfdt) to obtain four signals:

I cos(2πf$_d$t),
I sin(2πf$_d$t),
Q cos(2πf$_d$t), and
Q sin(2πf$_d$t)

Furthermore, these four signals are added and subtracted so as to obtain Ia, Ib, Qa and Qb:

$$Ia=I \cos(2\pi f_d t)-Q \sin(2\pi f_d t)$$

$$Qa=Q \cos(2\pi f_d t)+I \sin(2\pi f_d t)$$

$$Ib=I \cos(2\pi f_d t)+Q \sin(2\pi f_d t)$$

$$Qb=Q \cos(2\pi f_d t)-I \sin(2\pi f_d t)$$

Then, Ia and Qa are supplied to the QPSK modulation circuit 34a while Ib and Qb are supplied to the QPSK modulation circuit 34b.

As a result, a frequency signal having an offset of +f$_d$ is obtained from the QPSK modulation circuit 34a while a frequency signal having an offset of −f$_d$ is obtained from the QPSK modulation circuit 34b.

Figure 6:
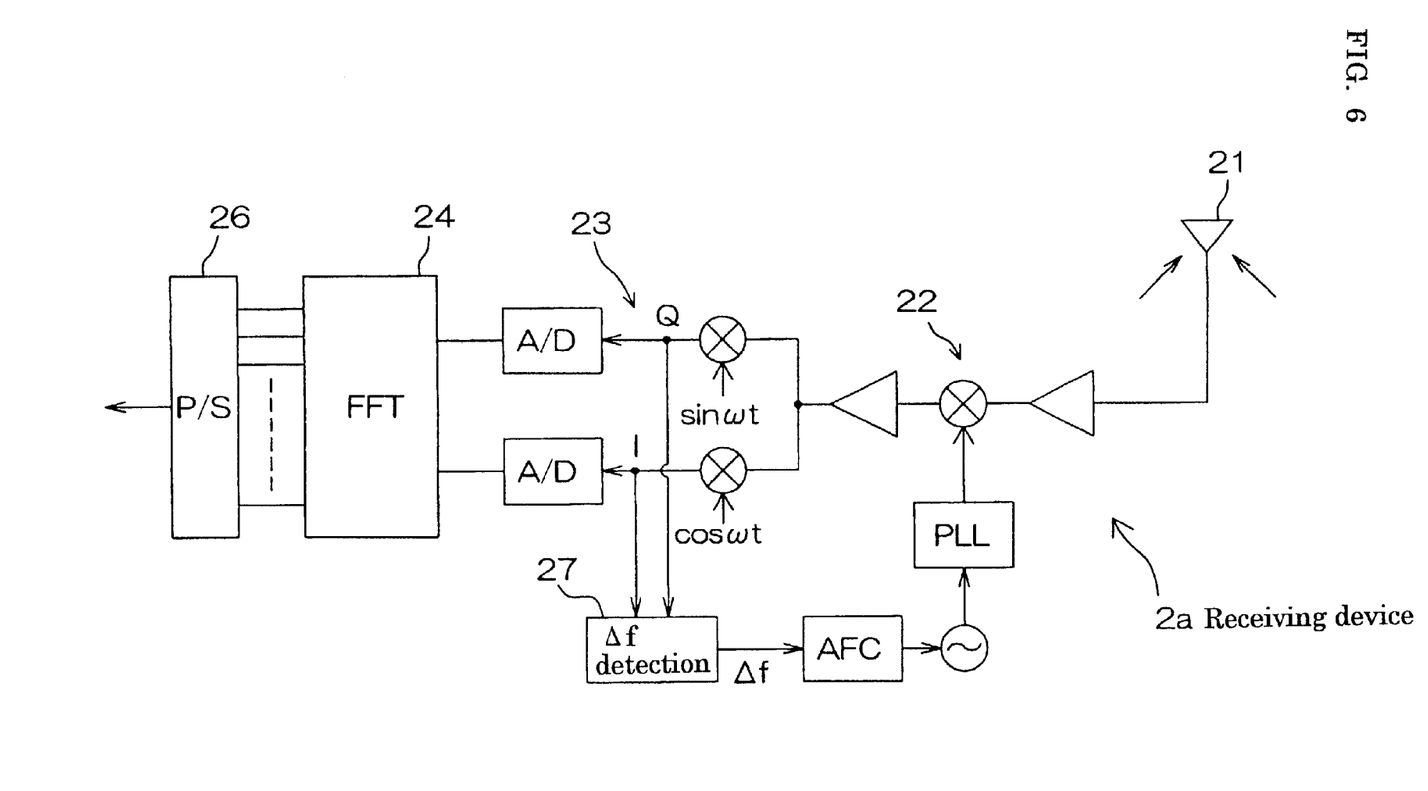
FIG. 6 is a block diagram showing the internal configuration of a receiving device 2a of the transmitting and receiving station 2.

FIG. 6 is a block diagram showing the internal configuration of the receiving device 2a of the receiving and transmitting station 2.

The receiving device 2a comprises a receiving antenna 21, a down-converter 22, a QPSK demodulation circuit 23, a Fourier transform circuit 24, a P/S (parallel/serial) converting circuit 26, a Δf detecting section 27, and the like.

The down-converter 22 of the receiving device 2a is a circuit which converts a wireless frequency into an intermediate frequency.

In contrast with the QPSK modulation circuit 34, the QPSK demodulation circuit 23 performs QPSK demodulation, wherein one of two divided signals is subjected to a sin wave while the other divided signal is subjected to a cos wave whose phase differs by 90° from that of the sin wave so as to A/D convert these divided signals.

The frequency difference Δf detecting section 27 detects a deviation Δf of the received frequency based on the in-phase component I (signal after being subjected to a cos wave) and the orthogonal component Q (signal after being subjected to a sin wave) of the QPSK demodulation circuit 23. The deviation Δf of the received frequency can be obtained based on a difference between a deflection angle $(I/Q)_t$ of a current I/Q and a deflection angle $(I/Q)_{t−1}$ sampled immediately before I/Q which are obtained by calculating the deflection angle of a complex number I/Q at sampling time intervals. $\Delta f=(I/Q)_t-(I/Q)_{t-1}$ The Δf detecting section 27 feeds back the deviation Δf of the received frequency to the down-converter 22 and the QPSK demodulation circuit 23, thereby accomplishing the function of correcting the deviation Δf of the received frequency.

The Fourier transform circuit 24 performs processing that is opposite to that of the inverse Fourier transform circuit 33 on the transmission side. The Fourier transform circuit 24 performs Fourier transform on the QPSK demodulated signal with the effective symbol length TS as a window length, thereby obtaining a demodulated signal.

The P/S converting circuit 26 converts a Fourier transformed parallel signal into a serial signal.

This data converted into a serial signal is transmitted to the central base station 1.

Next, the configuration of a vehicle-mounted mobile station to be mounted in the vehicle will be described.

Figure 7:
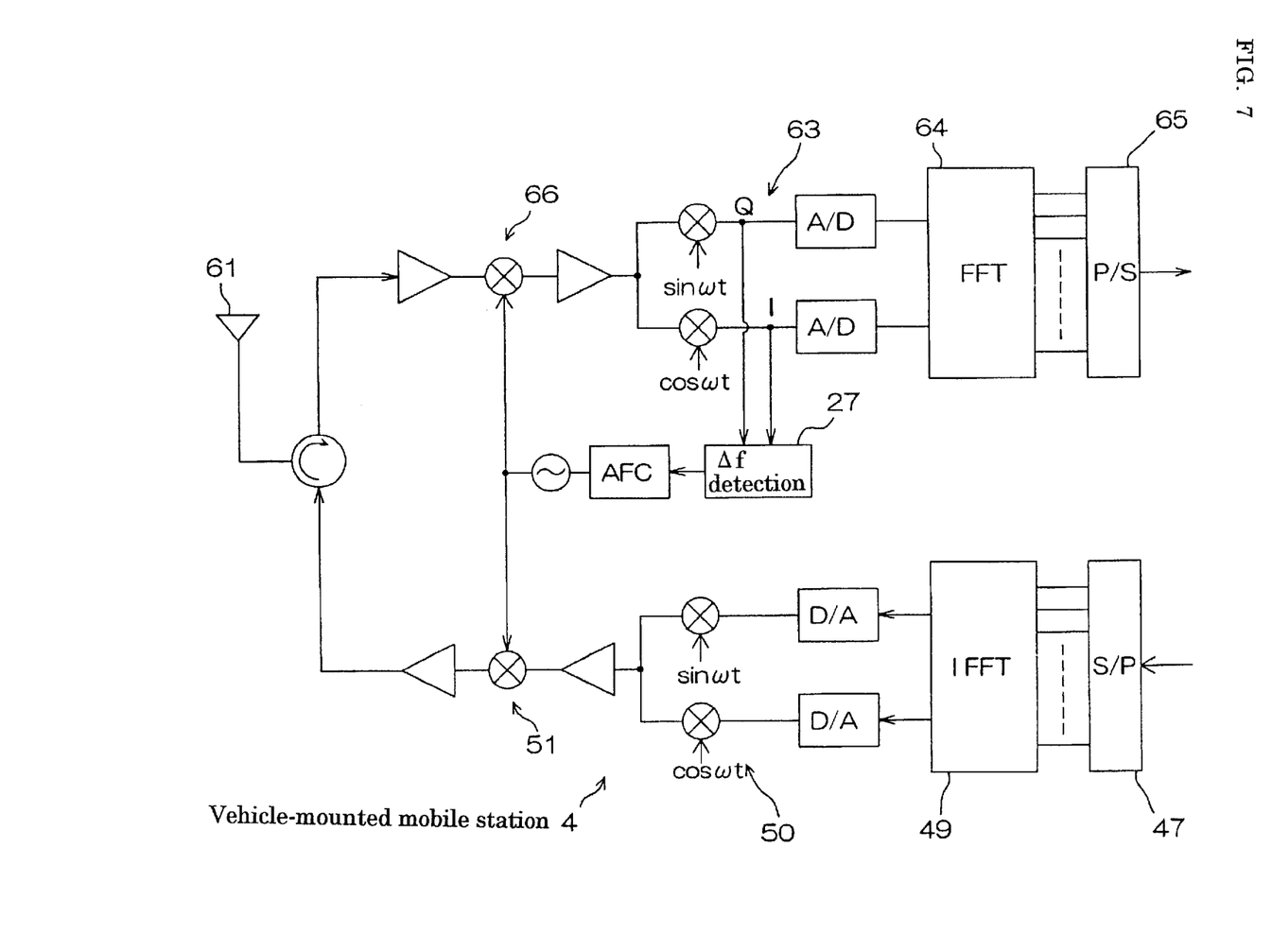
FIG. 7 is a conceptual view showing the configuration of a vehicle-mounted mobile station 4.

FIG. 7 is a conceptual view showing the configuration of a vehicle-mounted mobile station 4. The vehicle-mounted mobile station 4 consists of a transmitting and receiving antenna 61, a receiving section, a transmitting section and a frequency control section.

The transmitting section comprises a S/P converting circuit 47, an inverse Fourier transform circuit 49, a QPSK modulation circuit 50, and an up-converter 51 and the like.

The description for actions of the transmitting section is herein omitted because the configuration of the transmitting section is well-known and is identical with the main part of the configuration of the transmitting device 2b on the road shown in FIG. 2.

The receiving section comprises a down-converter 66 for converting a wireless frequency into an intermediate frequency, a QPSK demodulation circuit 63, a Fourier transform circuit 64, a P/S converting circuit 65 and the like. Since the configuration of the receiving part is also well-known and is similar to that of the receiving device 2a described with reference to FIG. 6, the description thereof is herein omitted.

The frequency control section has the function of detecting a deviation Δf of the received frequency of the receiving section and the function of performing frequency control of the receiving section based on the deviation Δf The function of detecting the deviation Δf of the received frequency can be described in the same manner as that for the function of the Δf detecting section 27 described with reference to FIG. 6. Specifically, deflection angles I/Q of a complex number I/Q are calculated at sample time intervals based on the in-phase component I (signal after being subjected to a cos wave) and the orthogonal component Q (signal after being subjected to a sin wave) of the QPSK demodulation circuit 63. The deviation Δf of the received frequency is then detected based on the difference between the deflection angle $(I/Q)_t$ of the current I/Q and a deflection angle $(I/Q)_{t−1}$ sampled immediately before.

$$\Delta f=(I/Q)_t-(I/Q)_{t-1}$$

The frequency control section feeds back the detected deviation Δf of the received frequency to an oscillator of the down-converter 66, thereby accomplishing the function of correcting the deviation Δf of the received frequency.

$$f = d_{org} - \Delta f$$

where $f_{org}$ is a frequency at which oscillation occurs when Δf is 0.

Figure 8:
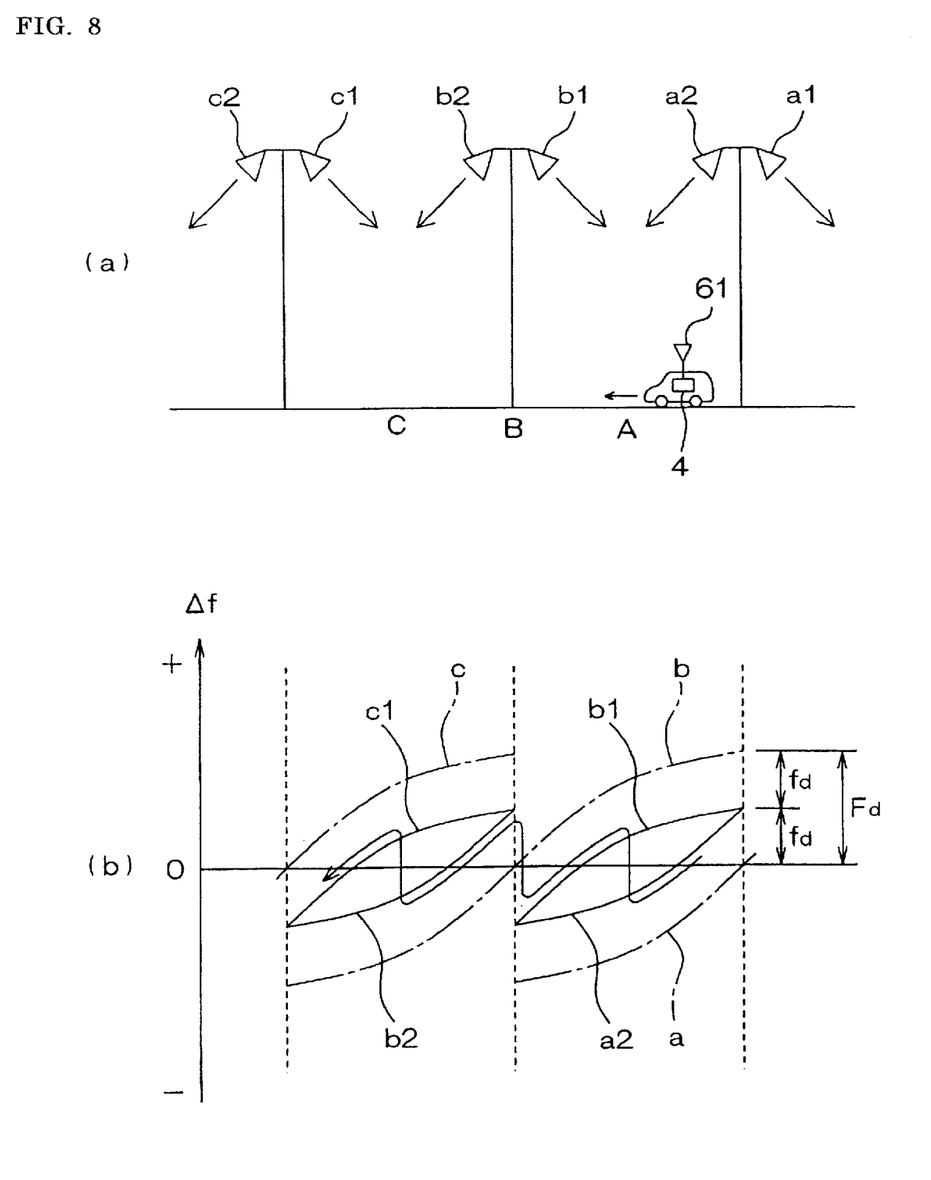
FIG. 8(a) is a layout drawing showing the arrangement of road antennas a1, a2; b1, b2; c1 and c2 of the road transmission equipment according to the present invention and a vehicle running thereunder.
FIG. 8(b) is a graph showing the transition of a deviation Δf of a frequency received by the vehicle-mounted mobile station.

FIG. 8 is a graph showing the thus obtained deviations Δf of frequencies.

FIG. 8(*a*) shows the arrangement of road antennas a1, a2; b1, b2; c1 and c2 of a road transmission equipment of the present invention and a vehicle running thereunder. On the vehicle, as described above, a transmitting and receiving antenna (hereinafter, simply referred to as a "receiving antenna") 61 and a vehicle-mounted mobile station 4 are mounted.

FIG. 8(*b*) is a graph showing the transitions of the deviations Δf of frequencies. The transition of a deviation of the frequency that the receiving antenna 61 receives from the road antenna a2 is indicated by the line a2, the transition of a deviation of the frequency that the receiving antenna 61 receives from the road antenna b1 is indicated by the line b1, the transition of a deviation of the frequency that the receiving antenna 61 receives from the road antenna b2 is indicated by the line b2, and the transition of a deviation of the frequency that the receiving, antenna 61 receives from the road antenna c1 is indicated by the line c1.

As can be seen in the graph of FIG. 8(*b*), the deviation Δf of the frequency is reduced to be almost half of that in FIG. 9 owing to the frequency offset fd of the transmitting device 2*b* on the road. For instance, taking b1 as an example, if there is no frequency offset fd, the vehicle is subjected to the Doppler shift of Fd at the maximum. However, since the frequency offset fd has been previously provided, the Doppler shift to which the vehicle is subjected is halved immediately under the road antennas al and a2.

Moreover, it is understood that the skipping of a frequency occurring in the vicinity A of the middle position between road antennas with movement of the vehicle is almost halved. Accordingly, in the case where automatic frequency control (AFC) is performed, the followability to frequency control is sufficient. As a result, the communication is not interrupted.

When the vehicle passes immediately under the transmitting and receiving station B, the skipping of the frequency does not theoretically occur in the case of FIG. 9, whereas the skipping occurs in the case of FIG. 8. The reason for the occurrence of skipping in the case of FIG. 8 can be explained as follows. Since two antennas, each having a different direction, are provided in a single transmitting and receiving station in the present invention, the received radio waves from these antennas are exchanged when the vehicle passes immediately under the transmitting and receiving station B, thereby causing the skipping of the frequency corresponding to double the amount of the deviation of the offset frequency.

Although the embodiment of the present invention has been described above, the present invention is not limited thereto. Various changes and modification in the design can be made without departing from the scope of the present invention.

What is claimed is:

1. A road transmission equipment used for a communication system between a road and a vehicle, which communicates between a road communication station arranged in a cell and a vehicle-mounted mobile station within the cell, comprising:

a first transmitting antenna having a directivity in a running direction of a vehicle, a second transmitting antenna having a directivity in the opposite direction to the running direction of the vehicle, a first transmitting section and a second transmitting section respectively connected to the first transmitting antenna and the second transmitting antenna to output signals of the same frequency, and a frequency correction section, wherein;

the frequency correction section provides the first transmitting section with a positive frequency offset for increasing the frequency of a signal supplied to the first transmitting antenna, and provides the second transmitting section with a negative frequency offset for lowering the frequency of a signal supplied to the second transmitting antenna.

2. A road transmission equipment as set forth in claim 1, wherein the amounts of the positive frequency offset and the negative frequency offset provided by the frequency correction section are equal to each other.

3. A road transmission equipment as set forth in claim 1, further comprising a speed detection means for detecting the speed of the vehicle running in the cell, wherein the frequency correction section sets the amount of the frequency offset based on the detected speed of the vehicle.

4. A road transmission equipment as set forth in claim 1, wherein the amount of the frequency offset provided by the frequency correction section is set to a fixed value on the assumption that the vehicle is subjected to constant Doppler shift.

5. A road transmission equipment according to any of claims 1 to 4, wherein each of the first transmitting section and the second transmitting section transmits an orthogonal frequency division multiplex (OFDM) modulated radio wave.

* * * * *